C. L. BURKETT & G. MILLER.
COMBINATION BACK REST, REAR SEAT, AND LUGGAGE CARRIER.
APPLICATION FILED SEPT. 20, 1913.
1,121,580.
Patented Dec. 15, 1914.
2 SHEETS—SHEET 1.
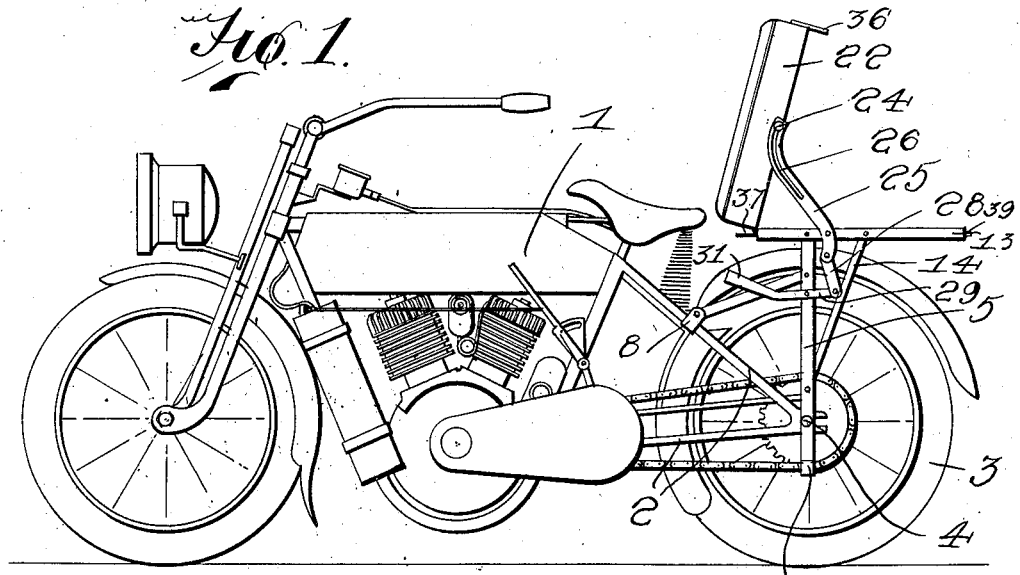
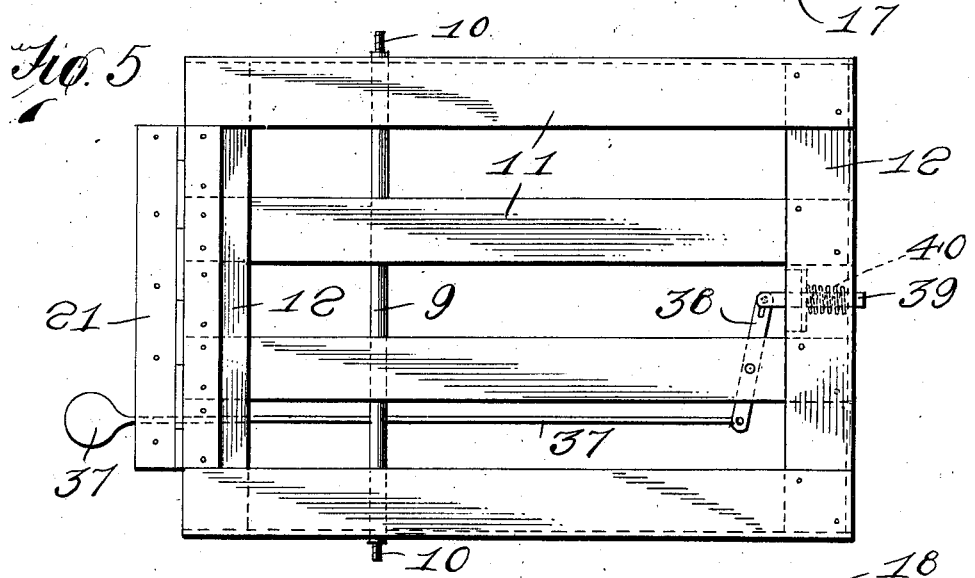
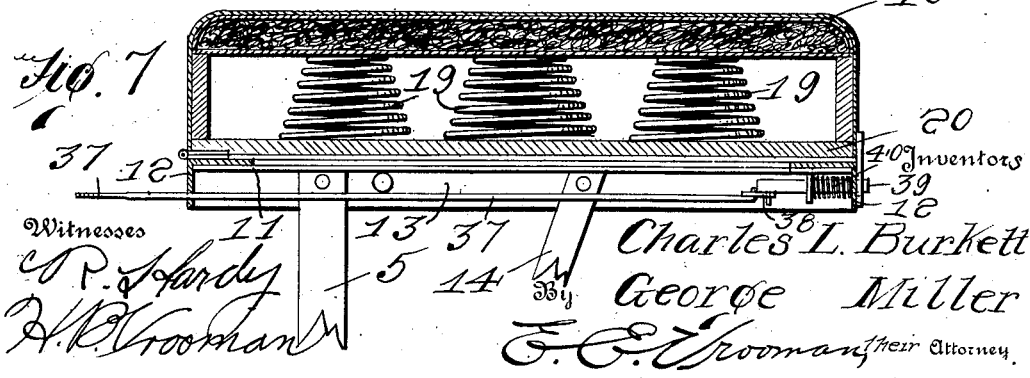
Witnesses
Inventors
Charles L. Burkett
George Miller
their Attorney C. L. BURKETT & G. MILLER.
COMBINATION BACK REST, REAR SEAT, AND LUGGAGE CARRIER.
APPLICATION FILED SEPT. 20, 1913.
1,121,580.
Patented Dec. 15, 1914.
2 SHEETS—SHEET 2.
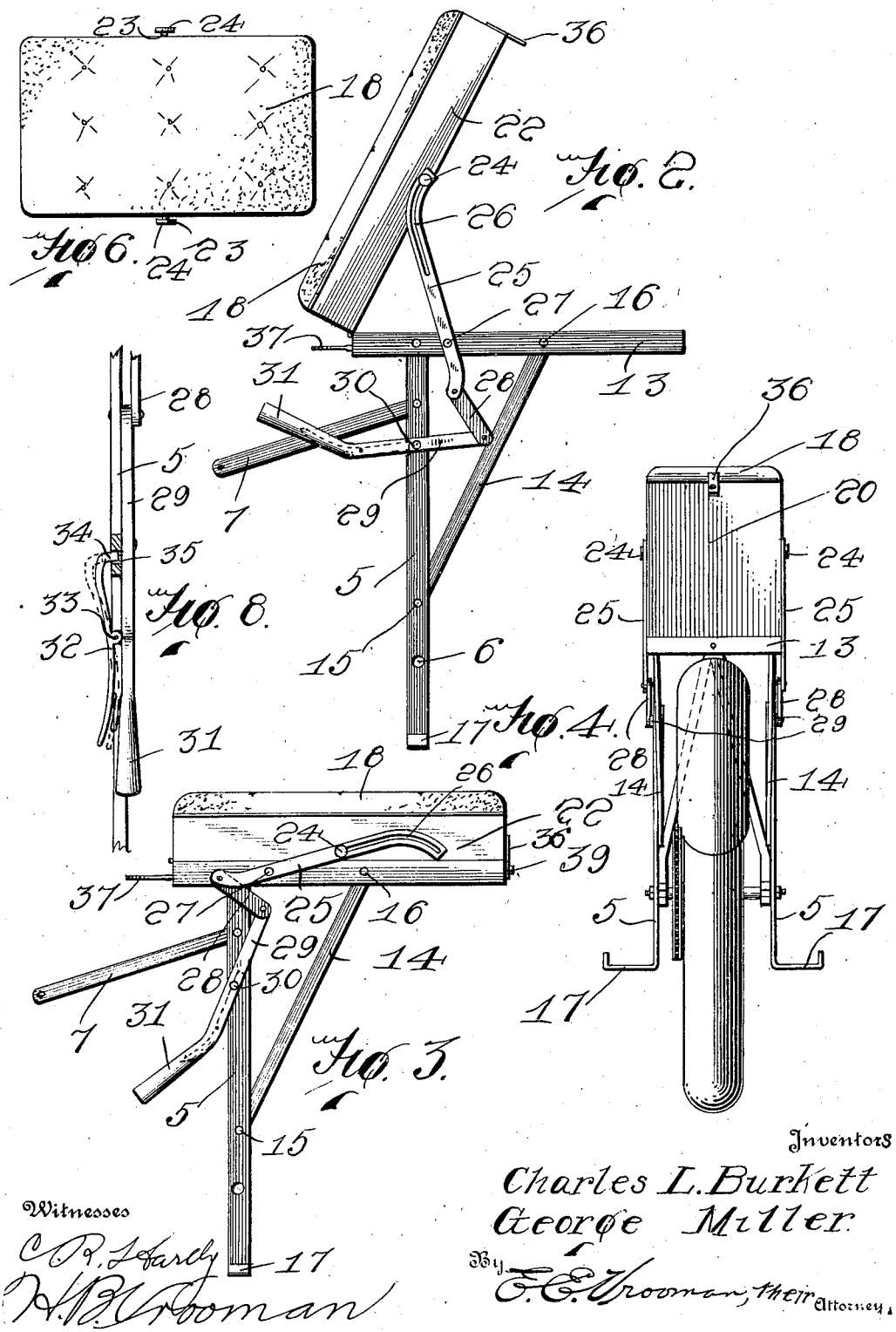
Inventors
Charles L. Burkett
George Miller

UNITED STATES PATENT OFFICE.

CHARLES L. BURKETT AND GEORGE MILLER, OF PERU, INDIANA.

COMBINATION BACK-REST, REAR SEAT, AND LUGGAGE-CARRIER.

1,121,580.  Specification of Letters Patent.  Patented Dec. 15, 1914.

Application filed September 20, 1913. Serial No. 790,902.

*To all whom it may concern:*

Be it known that we, CHARLES L. BURKETT and GEORGE MILLER, citizens of the United States of America, residing at Peru, in the county of Miami and State of Indiana, have invented certain new and useful Improvements in Combination Back-Rests, Rear Seats, and Luggage-Carriers, of which the following is a specification, reference being had therein to the accompanying drawing.

This invention relates to a motorcycle attachment and has for its object the production of a combination backrest, seat and luggage carrier which are held in firm engagement with the frame of the motorcycle in such position as to allow the same to be easily operated for placing the device in position for use.

Another object of the invention is the production of a backrest and seat which may be easily operated by actuating a lever whereby a motorcycle may be provided with a seat or a backrest as desired.

With these and other objects in view, this invention consists in general of certain novel arrangements, constructions and combinations which will be clearly set forth in the following specification and claims.

In the accompanying drawings: Figure 1 is a side elevation of the device showing the same carried by a motorcycle. Fig. 2 is a side elevation of the device showing the cushion raised to form a backrest. Fig. 3 is a side elevation of the invention showing the cushion in a closed position thereby constituting a seat. Fig. 4 is a rear elevation of a motorcycle showing the device carried thereby constituting a backrest. Fig. 5 is a top plan view of the luggage carrier which is fixedly secured to the frame of the motorcycle. Fig. 6 is a top plan view of the seat or backrest. Fig. 7 is a longitudinal section taken through the seat. Fig. 8 is a top plan view of the locking mechanism for holding the cushion in a vertical position.

Referring to the accompanying drawings by numerals, 1 indicates a motorcycle having the usual bars 2 constituting the frame. A wheel 3 is carried by the bars 2 by means of the axle 4. A pair of vertical standards 5 are carried by the axle 4 which passes through the openings 6 formed in the standards. A securing arm 7 is fixedly secured adjacent the upper end of each vertical standard 5 and is secured to one of the ribs 2 by means of the clamp 8. The upper ends of the vertical standards 5 are provided with a bar 9 which is held in engagement with the vertical standards 5 by means of the threaded ends 10.

The luggage carrier, comprises the longitudinal slats 11 and cleats 12, thereby forming a frame 13 which is supported by the bar 9 and the brace 14. This brace 14 is fixedly secured at its lower end to the vertical standard 5 as shown at 15, and at its upper end to the frame 13 as shown at 16. It will, of course, be obvious that a brace 14 is positioned upon each side of the wheel 3, as indicated in Fig. 4. It will also be noted that the lower end of each vertical standard 5 is provided with a foot rest 17.

From the foregoing description, it will be seen that the device is provided with a luggage carrier which is fixedly secured to the frame of the motorcycle.

The combined seat or backrest comprises a cushion having a padded portion 18 which is supported by the springs 19 carried by the base 20. This base 20 is hingedly secured to one of the cleats 12 of the luggage carrier by means of the hinge 21. The sides 22 of the seat are provided with the fixedly secured lugs 23 having the enlarged head 24. A finger 25 having a slot 26 is pivotally secured upon each side of the frame 13 as indicated at 27. The lug 23 is adapted to ride within the slot 26 of the finger 25 as the cushion is raised or lowered. A link 28 is secured to the lower end of the finger 25 and this link is attached at its opposite end to the operating lever 29. This operating lever 29 is pivotally secured to one of the vertical standards 5 as indicated at 30 and is provided at its end portion with a handle 31. When the seat is in the position illustrated in Fig. 3, by raising the handle 31 the link 28 will be moved downward so as to draw upon the lower end of the finger 25. This will cause the finger 25 to swing upon the pivot 27 and will swing the cushion upon the hinge 21 as the lug 23 rides within the slot 26. As soon as the seat has been raised to form a backrest as indicated in Figs. 1, 2 and 4, the pivotally secured latch 32 which is secured to the operating lever 29 as indicated at 33 will lock the backrest into position by means of the lip 34 bearing against the pocket 35 formed in the standard 5.

When the cushion is in a closed position to form a seat, the latch 36 will pass over the end portion of the luggage carrier. This luggage carrier is provided with a slidably mounted rod 37 which is connected to the pivotally mounted strip 38 which is in turn pivotally connected to the plunger 39. This plunger 39 is provided with a spring 40 for normally holding the same in engagement with the latch 36 whereby when the cushion is in a closed position it will be held firmly in position for constituting a seat for the device.

From the foregoing description, it will be seen that a simple and efficient device has been produced for constituting a seat or backrest and which is also provided with simple means for actuating the device for moving the same into the position desired.

What is claimed as new is:—

1. In a device of the class described, the combination with the frame of a motorcycle, vertical standards fixedly secured to said frame, a platform fixedly secured to the upper ends of said vertical standards thereby constituting an article carrier, a cushion pivotally secured to said platform, said cushion provided with a lug having an enlarged head upon its outer end, a finger provided with a slot carried by said lug whereby said lug will work in said slot, said finger pivotally secured to said platform, a link carried by the lower end of said finger, an operating lever pivotally secured to one of said standards, said operating lever pivotally secured to said link whereby said cushion may be raised or lowered by swinging said operating lever, and means carried by said operating lever for locking the cushion in a raised position when desired.

2. In a device of the class described, the combination with the frame of a motorcycle, vertical standards carried by said frame, a platform fixedly secured to the upper ends of said standards, a cushion pivotally secured to said platform, said cushion provided with a lug having an enlarged head, a finger having a slot secured to said lug for allowing said lug to ride within said slot, said finger pivotally secured to said platform, said finger provided at its lower end with a link, an operating lever pivotally secured to one of said standards and connected with said link whereby said cushion may be raised and lowered as desired, a latch pivotally secured to said operating lever, said latch adapted to engage one of said vertical standards when said cushion is in a raised position whereby said cushion will constitute a backrest.

In testimony whereof we hereunto affix our signatures in presence of two witnesses.

CHARLES L. BURKETT.
GEORGE MILLER.

Witnesses:
EDGAR P. KLING,
C. Y. ANDREWS.